United States Patent
Costa et al.

(10) Patent No.: US 10,460,746 B2
(45) Date of Patent: Oct. 29, 2019

(54) SYSTEM, METHOD, AND DEVICE FOR REAL-TIME LANGUAGE DETECTION AND REAL-TIME LANGUAGE HEAT-MAP DATA STRUCTURE CREATION AND/OR MODIFICATION

(71) Applicant: MOTOROLA SOLUTIONS, INC, Chicago, IL (US)

(72) Inventors: Fabio M. Costa, Weston, FL (US); Alejandro G. Blanco, Fort Lauderdale, FL (US); Patrick D. Koskan, Jupiter, FL (US); Adrian Ho Yin Ng, Bukit Mertajam (MY); Boon Beng Lee, Bayan Lepas (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 91 days.

(21) Appl. No.: 15/798,463

(22) Filed: Oct. 31, 2017

(65) Prior Publication Data

US 2019/0130931 A1    May 2, 2019

(51) Int. Cl.
| | | |
|---|---|---|
| *G10L 21/10* | (2013.01) | |
| *G06Q 10/06* | (2012.01) | |
| *G08B 27/00* | (2006.01) | |
| *G06F 17/28* | (2006.01) | |
| *G10L 15/00* | (2013.01) | |

(52) U.S. Cl.
CPC ............ *G10L 21/10* (2013.01); *G06F 17/289* (2013.01); *G06Q 10/063112* (2013.01); *G08B 27/001* (2013.01); *G10L 15/005* (2013.01)

(58) Field of Classification Search
CPC .. G06F 17/28; G06F 16/2457; G06F 16/9537; G06F 17/2785; G06F 17/289; G10L 21/10; G10L 21/16; G10L 21/18; G10L 15/005; G06Q 30/02; G06Q 30/0256; G06Q 30/0259; G08B 27/001
See application file for complete search history.

(56) References Cited

U.S. PATENT DOCUMENTS

| | | | |
|---|---|---|---|
| 7,562,007 B2 | 7/2009 | Hwang | |
| 8,311,824 B2 | 11/2012 | Lubowich et al. | |
| 8,868,430 B2 | 10/2014 | Burvall et al. | |
| 9,471,567 B2 | 10/2016 | Duyaguit | |
| 9,521,514 B2* | 12/2016 | Miller | ........... H04W 4/021 |
| 2007/0116189 A1 | 5/2007 | Clawson | |
| 2007/0288422 A1* | 12/2007 | Cao | ........... G06F 16/29 |
| 2009/0186322 A1* | 7/2009 | Johnson | ........... G06F 17/289 |
| | | | 434/157 |

(Continued)

*Primary Examiner* — Abdelali Serrou
(74) *Attorney, Agent, or Firm* — Daniel R. Bestor

(57) ABSTRACT

A process for real-time language detection and language heat map data structure modification includes a computing device receiving, from a first electronic audio source, first audio content and identifying a first geographic location of the first audio content. The computing device then determines that the first audio content includes first speech audio and identifies a first language in which the first speech audio is spoken. A first association is created between the first geographic location and the first language, and a real-time language heat-map data structure modified to include the created first association. Then a further action is taken by the computing device as a function of the modified real-time language heat-map data structure.

19 Claims, 6 Drawing Sheets

(56) References Cited

U.S. PATENT DOCUMENTS

| | | | |
|---|---|---|---|
| 2010/0107135 A1* | 4/2010 | Arsanjani | G06Q 10/067 |
| | | | 717/104 |
| 2010/0190479 A1* | 7/2010 | Scott | G06F 17/289 |
| | | | 455/414.1 |
| 2012/0264395 A1 | 10/2012 | Bradburn et al. | |
| 2013/0129307 A1* | 5/2013 | Choe | H04N 5/2621 |
| | | | 386/227 |
| 2013/0297378 A1* | 11/2013 | Hong | G06Q 50/16 |
| | | | 705/7.29 |
| 2014/0215330 A1* | 7/2014 | Lee | G09B 29/007 |
| | | | 715/703 |
| 2014/0270144 A1 | 9/2014 | Bentley et al. | |
| 2015/0067819 A1* | 3/2015 | Shribman | H04L 67/06 |
| | | | 726/12 |
| 2015/0070506 A1* | 3/2015 | Chattopadhyay | G06K 9/00718 |
| | | | 348/159 |
| 2015/0245190 A1* | 8/2015 | Hatton | H04W 4/90 |
| | | | 455/404.2 |
| 2016/0085822 A1* | 3/2016 | Chadha | G06F 16/9535 |
| | | | 707/776 |
| 2016/0127804 A1* | 5/2016 | Wilson | H04N 21/814 |
| | | | 725/33 |
| 2016/0173787 A1* | 6/2016 | Yun | H04N 5/23229 |
| | | | 348/143 |
| 2017/0011401 A1* | 1/2017 | Steinlicht | G06Q 20/405 |
| 2017/0185579 A1* | 6/2017 | Zhu | G06F 3/0482 |
| 2018/0173494 A1* | 6/2018 | Choi | G06F 3/167 |
| 2018/0182381 A1* | 6/2018 | Singh | G06F 17/2775 |
| 2018/0349818 A1* | 12/2018 | Chan | G06Q 10/0639 |
| 2019/0065458 A1* | 2/2019 | Brunet | G06Q 50/01 |

* cited by examiner

US 10,460,746 B2

SYSTEM, METHOD, AND DEVICE FOR REAL-TIME LANGUAGE DETECTION AND REAL-TIME LANGUAGE HEAT-MAP DATA STRUCTURE CREATION AND/OR MODIFICATION

BACKGROUND OF THE INVENTION

Video and audio coverage of many major metropolitan areas is reaching a point of saturation such that nearly every square foot of some cities is under surveillance by at least one static or moving audio/visual camera. Similarly, enterprise and commercial customers are beginning to deploy video and audio recording devices throughout their privately owned real estate as well for security, data mining, or other purposes. Some governmental agencies and commercial entities are deploying their own audio and/or audio/video recording devices or are obtaining legal access to separately owned audio/video recording devices, or some combination thereof, and are beginning to deploy centralized command or security centers to monitor these recording devices. As the number of audio and audio/video feeds increases, however, it becomes difficult to review all of the feeds being provided in real-time and to derive useful information from such feeds, such that the increased value of such audio and audio/video monitoring and the ability to identify situations of concern or opportunity decreases substantially.

Thus, there exists a need for an improved method, device, and system for real-time language detection and language heat-map data structure creation and/or modification that can parse the enormous amount of audio information being generated across such audio and audio/video feeds and for taking further automated and intelligent actions based thereon.

BRIEF DESCRIPTION OF THE SEVERAL VIEWS OF THE DRAWINGS

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Figure 1:
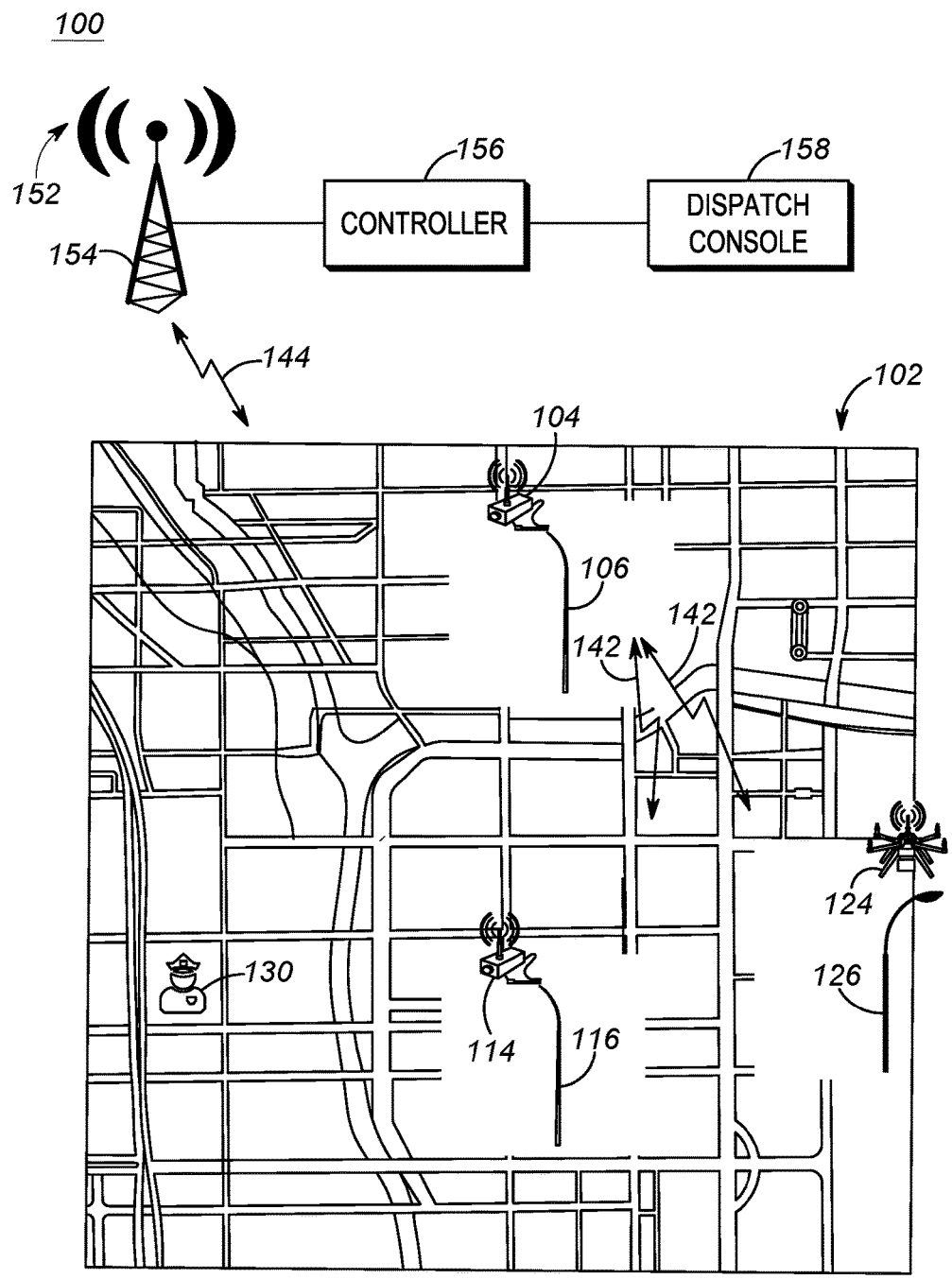
FIG. 1 is a system diagram illustrating an example operating environment for real-time language detection and real-time language heat-map data structure creation and modification in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Disclosed is an improved technical method, device, and system for real-time language detection and real-time language heat-map data structure creation and/or modification via a deployed matrix of audio recording devices and that is indicative of various detected groups of spoken language speaker(s) in real-time across a geographic region such as a city neighborhood or a retail or commercial real estate campus, such that further automated and intelligent actions can be taken to support detected language-specific speakers or to derive further benefit from detected language-specific speakers.

In one embodiment a process for real-time language detection and language heat map data structure modification includes: receiving, at an electronic computing device from a first electronic audio source, first audio content; identifying, by the electronic computing device, a first geographic location of the first audio content as one of a location of the first electronic audio source and a sound localization process calculated as a function of the location of the first electronic audio source; determining, by the electronic computing device, that the first audio content includes first speech audio; identifying, by the electronic computing device from the first audio content, a first language in which the first speech audio is spoken and creating a first association between the first geographic location and the first language; modifying, by the electronic computing device based on the first audio content, a real-time language heat-map data structure to include the created first association; and taking a further action, by the electronic computing device, as a function of the modified real-time language heat-map data structure comprising at least one of: (i) electronically displaying at least a modified portion of the modified real-time language heat-map data structure at an electronic display coupled to the electronic computing device, (ii) transmitting at least the modified portion of the modified real-time language heat-map data structure to another electronic computing device for further processing, (iii) electronically transmitting a dispatch instruction to a user having a skill or a need in the first language to the first geographic location, and (iv) electronically transmitting a notification to a user having a skill or a need in the first language including identifying the first geographic location and the first language.

In a further embodiment, a computing device for real-time language detection and language heat-map data structure modification includes: one or more non-transitory, computer-readable memories; one or more transceivers; and one or more processors that, in response to executing instructions stored in the one or more non-transitory, computer-readable memories, perform a set of functions comprising: receive, from a first electronic audio source, first audio content; identify a first geographic location of the first audio content as one of a location of the first electronic audio source and a sound localization process calculated as a function of the location of the first electronic audio source; determine that the first audio content includes first speech audio; identify, from the first audio content, a first language in which the first speech audio is spoken and creating a first association between the first geographic location and the first language; modify, based on the first audio content, a real-time language heat-map data structure to include the created first association; and take a further action as a function of the modified real-time language heat-map data structure comprising at least one of: (i) electronically displaying at least a modified portion of the modified real-time language heat-map data structure at an electronic display coupled to the electronic computing device, (ii) transmitting at least the modified portion of the modified real-time language heat-map data structure to another electronic computing device for further processing, (iii) electronically transmitting a dispatch instruction to a user having a skill or a need in the first language to the first geographic location, and (iv) electronically transmitting a notification to a user having a skill or a need in the first language including identifying the first geographic location and the first language.

Each of the above-mentioned embodiments will be discussed in more detail below, starting with example communication and device architectures of the system in which the embodiments may be practiced, followed by an illustration of processing steps for achieving an improved method, device, and system for real-time language detection and real-time language heat-map data structure creation and/or modification via a deployed matrix of audio recording devices and that is indicative of various detected groups of spoken language speaker(s) in real-time across a geographic region such as a city neighborhood or a retail or commercial real estate campus, such that further automated and intelligent actions can be taken to support detected language-specific speakers or to derive further benefit from detected language-specific speakers. Further advantages and features consistent with this disclosure will be set forth in the following detailed description, with reference to the figures.

1. Communication System and Device Structures

Referring now to the drawings, and in particular FIG. 1, an example communication system diagram illustrates a system 100 having an outdoor geographic area 102 of interest that includes a first fixed audio or audio/video recording device 104 affixed to a first street lamp 106, a second audio or audio/video recording device 114 affixed to a second street lamp 116 deployed a particular geographic distance away from the first street lamp 106, a third mobile audio or audio/video recording device 124 hovering over or temporarily affixed to a third street lamp 126 deployed a particular geographic distance away from the first and second street lamps 106, 116, and a user 130 having a specific language-speaking skill or need and an electronic computing device including a transceiver.

Each of the audio or audio/video recording devices 104, 114, 124 may be capable of directly wirelessly communicating via direct-mode wireless link(s) 142 or via a direct mode wired link, and/or may be capable of communicating via wired or wireless infrastructure radio access network (RAN) 152 link(s) 144.

Each audio or audio/video recording device 104, 114, 124 may include any type of input transducer (i.e., microphone) capable of capturing audio across a corresponding geographic area of interest surrounding the recording device that is a sub-area of geographic area 102 of interest (the sub-areas of which may or may not overlap with one another), illustrated in FIG. 1 as a cartographic map of roads in a city, but in other embodiments, may include an interior and/or exterior of a commercial building or retail establishment including rooms and/or hallways, or any other type of interior and/or exterior geographic space across which a plurality of recording devices may be disposed in an ordered, semi-ordered, semi-random, or random placement.

The fixed recording devices 104, 114 are fixed in the sense that they cannot physically move in any significant direction (e.g., more than one foot or one inch in any horizontal or vertical direction). However, this does not mean that the recording devices could not integrate some form of microphone steering to focus what may perhaps default to a 360 degree audio coverage angle of approximately 50-100 feet in range into a more narrow focused beam of geographic coverage relative to the location of the recording device, such as perhaps a 10-45 degree audio coverage angle of approximately 50-500 feet in range. Other examples and arrangements are possible as well.

The mobile recording device 124 may be coupled to a flight-capable airborne drone having an electromechanical drive element and a microprocessor that is capable of taking flight under its own control, under control of a remote operator, or some combination thereof, and capturing audio of an identified region of interest prior to, during, or after flight. Similar to the fixed recording devices 104, 114, the mobile recording device 124 may perhaps include a single omni-directional microphone, or may include an array of microphones capable of steering coverage into a more limited angular direction but at a farther potential range.

While the drone depicted in FIG. 1 is an airborne drone, the airborne drone could additionally or alternatively be a ground-movement or water-movement capable mobile vehicle, among many other possibilities. And while the airborne drone is illustrated in FIG. 1 as being temporarily positioned at the third street lamp 126 (perhaps functioning as a charging station to charge a battery in the airborne drone while it is not in flight), in other embodiments, the airborne drone may be positioned atop a building, atop a stop light, or physically attached to some other structure, or physically attached to nothing at all (e.g., hovering in place or in-flight).

The recording devices 104, 114, 124 may be continuously on and continuously sampling environmental audio in a geographic area surrounding or adjacent to their location, may periodically turn on and capture audio environmental audio in a geographic area surrounding or adjacent to their location before turning back off, or may be triggered to begin capturing audio as a result of some other action, such as a motion detected in the corresponding area of interest by a separate motion detector device communicatively coupled to the recording devices 104, 114, 124, or via a signal received from the wireless infrastructure RAN 152 to begin sampling environmental audio in the geographic area surrounding or adjacent to their location, among other possibilities.

Audio captured at the recording devices 104, 114, 124 may be stored at the recording devices 104, 114, 124 themselves, and/or may be transmitted to a separate storage or processing device (e.g., one of the recording devices 104, 114, 124 acting as a master device or some other computing device not shown in FIG. 1) via direct-mode wireless link(s) 142 and/or to an infrastructure storage or processing device via wireless link(s) 144 to the RAN 152, among other possibilities.

User 130 may be any user that may take advantage of the real-time language heat-map data structure and which may request a location of one or more specific-language speakers within geographic area 102 or which may be dispatched to aid or otherwise interface with a particular group of one or more specific-language speakers identified via the real-time language heat-map data structure. User 130 may have particular language skills (e.g., be able to speak one or more particular languages) or may have a particular language need (e.g., be seeking someone who can speak a particular language or seeking someone that is currently speaking or was recently speaking a particular language at a particular geographic location at a particular day and/or time). Information regarding user's 130 language skills and/or needs may be stored at the user's 130 electronic computing device and provided to controller 156, or may be pre-populated at controller 156 via some other manual or automatic mechanism, among other options. User 130 may be, for example, a first responder police officer or medic, or may be a retail or commercial salesman, or any other type of person having a particular language need or skill. In some examples, the real-time language heat-map data structure may be caused to be provided to and/or displayed at the user's 130 electronic computing device, while in other examples, the user 130 may use the electronic computing device to transmit a language need request and/or to receive a dispatch responsive to the language need request or in response to the user's language skills matching a particular language at a particular geographic location, among many other possibilities.

Infrastructure RAN 152 may implement over wireless link(s) 144 a conventional or trunked land mobile radio (LMR) standard or protocol such as ETSI Digital Mobile Radio (DMR), a Project 25 (P25) standard defined by the Association of Public Safety Communications Officials International (APCO), Terrestrial Trunked Radio (TETRA), or other LMR radio protocols or standards. In other embodiments, infrastructure RAN 152 may additionally or alternatively implement over wireless link(s) 144 a Long Term Evolution (LTE) protocol including multimedia broadcast multicast services (MBMS), an open mobile alliance (OMA) push to talk (PTT) over cellular (OMA-PoC) standard, a voice over IP (VoIP) standard, or a PTT over IP (PoIP) standard. In still further embodiments, infrastructure RAN 152 may additionally or alternatively implement over wireless link(s) 144 a Wi-Fi protocol perhaps in accordance with an IEEE 802.11 standard (e.g., 802.11a, 802.11b, 802.11g) or a WiMAX protocol perhaps operating in accordance with an IEEE 802.16 standard. Other types of wireless protocols could be implemented as well. Furthermore, and in some embodiments, infrastructure wireless link(s) 144 may, in some embodiments, be replaced by wired communications links, such as a twisted pair wire, a coaxial cable, a fiber-optic link, or a similar physical connection to a wireline network, over which an Ethernet, USB, or other wire-line protocol may be implemented.

The infrastructure RAN 152 is illustrated in FIG. 1 as providing coverage for the recording devices 104, 114, 124 via a single fixed terminal 154 coupled to a controller 156 (e.g., radio controller, call controller, PTT server, zone controller, MME, BSC, MSC, site controller, Push-to-Talk controller, audio processing device, or other network device) and including a dispatch console 158 operated by a dispatcher. In other embodiments, more or different types of fixed terminals may provide RAN services to the recording devices 104, 114, 124.

Figure 2:
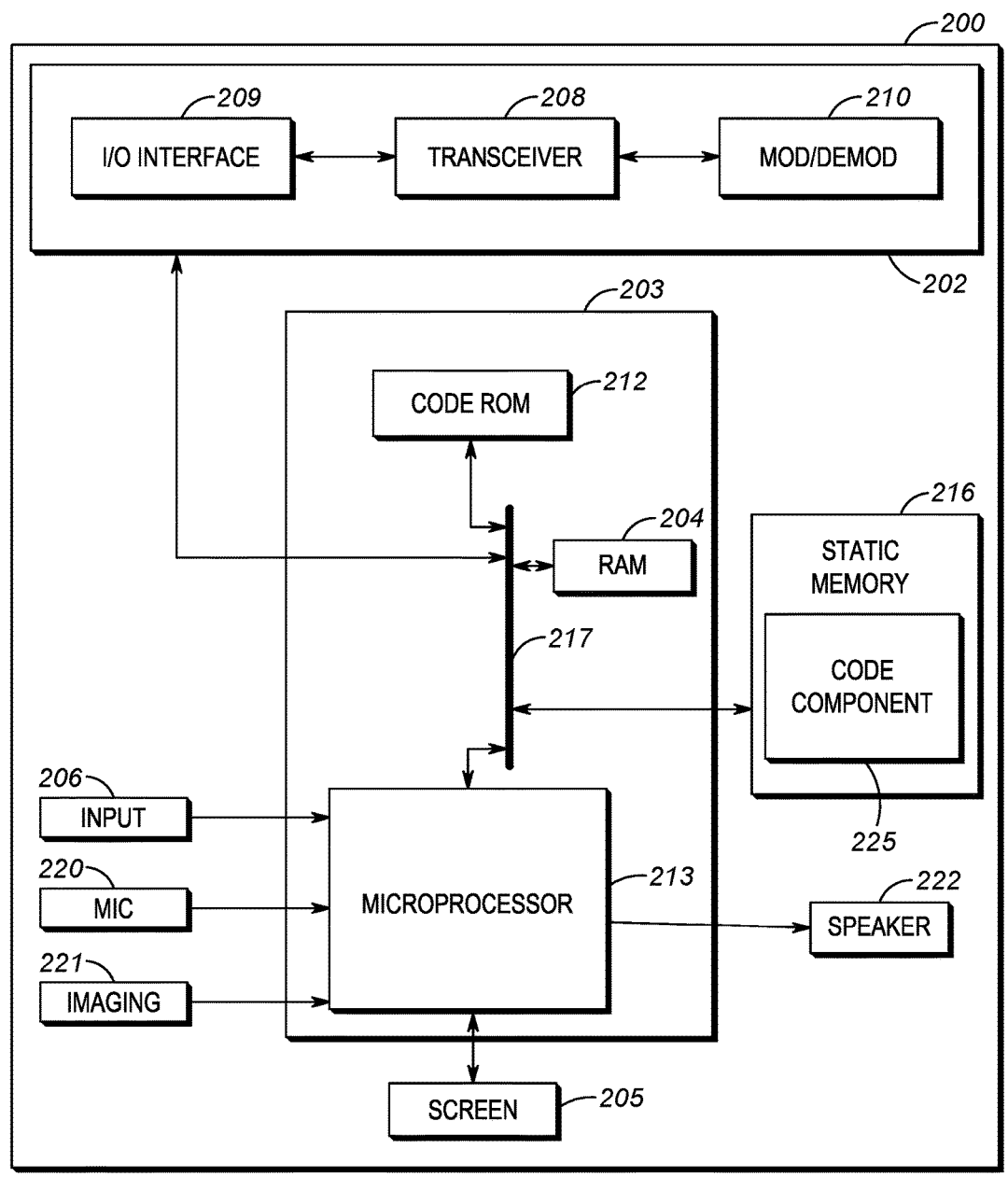
FIG. 2 is a device diagram showing a device structure of a computing device of FIG. 1 in accordance with some embodiments.

Now referring to FIG. 2, a schematic diagram illustrates an electronic computing device 200 according to some embodiments of the present disclosure. Computing device 200 may be, for example, the same as or similar to the recording devices 104, 114, 124, the controller 156 of FIG. 1, or the user's 130 electronic computing device, and/or may be a distributed computing device across two or more of the foregoing and linked via a wired and/or wireless communication link(s). As shown in FIG. 2, computing device 200 includes a communications unit 202 coupled to a common data and address bus 217 of a processing unit 203. The computing device 200 may also include an input unit (e.g., keypad, pointing device, touch-sensitive surface, etc.) 206 and a display screen 205, each coupled to be in communication with the processing unit 203.

A microphone 220 may be present for capturing environmental audio from a user and/or another user that is further processed by processing unit 203 in accordance with the remainder of this disclosure and/or is transmitted as voice stream data by communication unit 202 to other portable radios and/or other devices. In some embodiments, microphone 220 may be a fixed or mobile audio recording device for capturing audio content in a manner as set forth herein. An imaging device 221 may provide images and/or video of an area in a field of view of the computing device 200 for further processing by the processing unit 203. A communications speaker 222 may be present for reproducing audio that is decoded from voice streams of voice calls received via the communication unit 202 from other portable radios, from a drone transceiver, from a fixed or mobile camera transceiver, and/or from an infrastructure RAN device.

The processing unit 203 may include a code Read Only Memory (ROM) 212 coupled to the common data and address bus 217 for storing data for initializing system components. The processing unit 203 may further include a microprocessor 213 coupled, by the common data and address bus 217, to a Random Access Memory (RAM) 204 and a static memory 216.

The communications unit 202 may include one or more wired or wireless input/output (I/O) interfaces 209 that are configurable to communicate with other devices, such as a portable radio, tablet, wireless RAN, and/or vehicular transceiver.

The communications unit 202 may include one or more wireless transceivers 208, such as a DMR transceiver, a P25 transceiver, a Bluetooth transceiver, a Wi-Fi transceiver perhaps operating in accordance with an IEEE 802.11 standard (e.g., 802.11a, 802.11b, 802.11g), an LTE transceiver, a WiMAX transceiver perhaps operating in accordance with an IEEE 802.16 standard, and/or other similar type of wireless transceiver configurable to communicate via a wireless radio network. The communications unit 202 may additionally or alternatively include one or more wireline transceivers 208, such as an Ethernet transceiver, a USB transceiver, or similar transceiver configurable to communicate via a twisted pair wire, a coaxial cable, a fiber-optic link, or a similar physical connection to a wireline network. The transceiver 208 is also coupled to a combined modulator/demodulator 210.

The microprocessor 213 has ports for coupling to the input unit 206 and the microphone unit 220, and to the display screen 205, imaging device 221, and speaker 222. Static memory 216 may store operating code 225 for the microprocessor 213 that, when executed, performs one or more of the computing device steps set forth in FIG. 3 and accompanying text. Static memory 216 may also store, permanently or temporarily, audio captured via its microphone, audio provided to it from other recording devices via the I/O interface 209, a language skills database associating particular users (e.g., officers, employees, salesmen, a user of the computing device 200, etc.) by unique identifiers (e.g., names or ID numbers) with particular languages (e.g., English, Spanish, Dutch, Italian) that they are proficient at, and a real-time language heat-map data structure including associations between detected particular languages and locations at which such particular languages were detected and as extracted from the audio captured via its microphone and/or the audio provided to it via the I/O interface 209, among other possibilities. Other information may also be captured and stored in the real-time language heat-map data structure commensurate with the remainder of this disclosure.

Static memory 216 may comprise, for example, a hard-disk drive (HDD), an optical disk drive such as a compact disk (CD) drive or digital versatile disk (DVD) drive, a solid state drive (SSD), a tape drive, a flash memory drive, or a tape drive, to name a few.

2. Processes for Operating a Computing Device to Create and/or Modify a Real-Time Language Heat-Map Data Structure and Take Further Action as a Function Thereof Turning now to FIG. 3, a flowchart diagram illustrates a process 300 for real-time language detection and real-time language heat-map data structure creation and/or modification via a deployed matrix of audio recording devices and that is indicative of various detected groups of spoken language speaker(s) in real-time across a geographic region such as a city neighborhood or a retail or commercial real estate campus, such that further automated and intelligent actions can be taken to support detected language-specific speakers or to derive further benefit from detected language-specific speakers.

Figure 3:
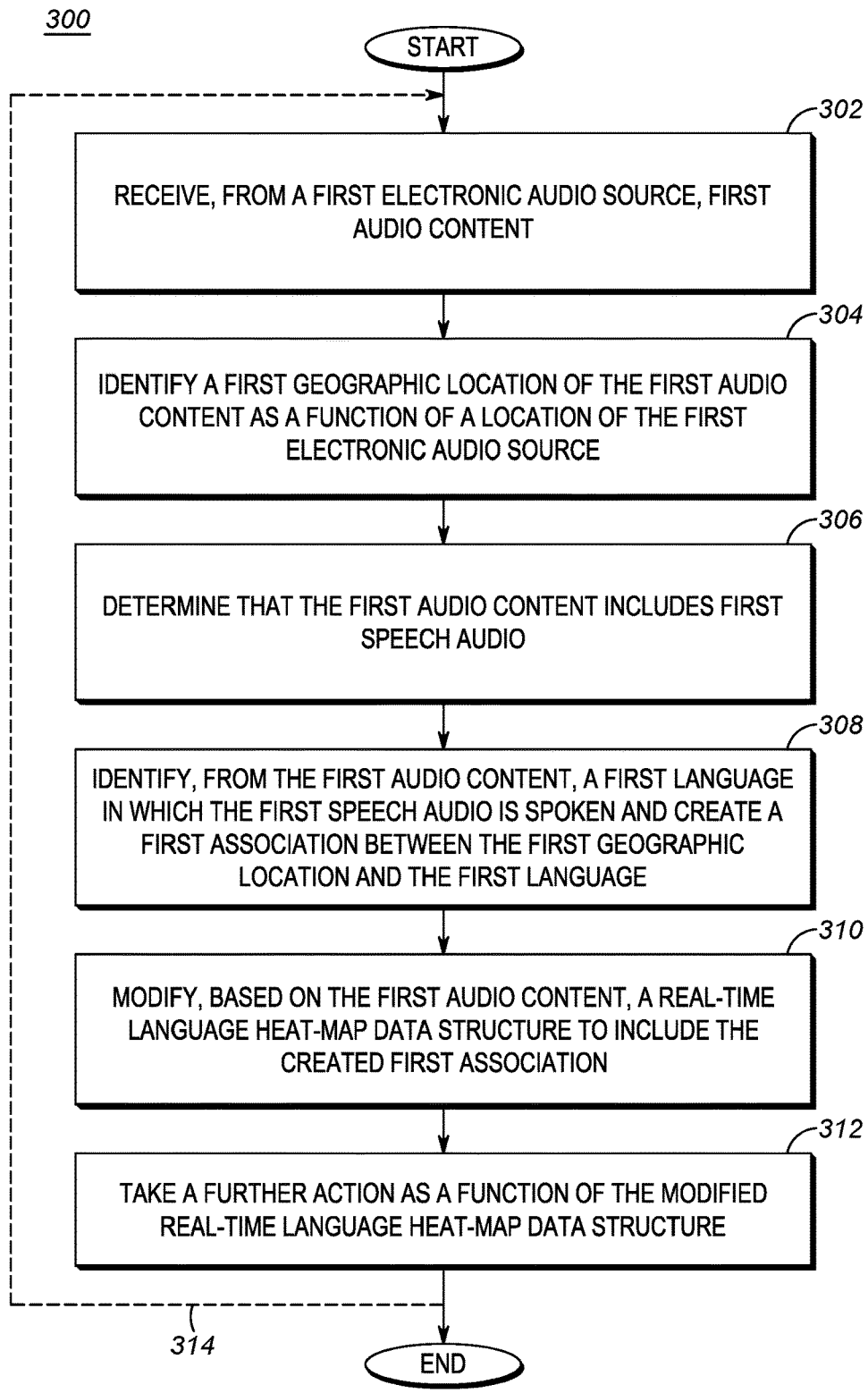
FIG. 3 illustrates a flowchart setting forth process steps for operating the computing device(s) of FIGS. 1 and/or 2 to provide real-time language detection and real-time language heat-map data structure creation and/or modification in accordance with some embodiments.

While a particular order of processing steps, message receptions, and/or message transmissions is indicated in FIG. 3 for exemplary purposes, timing and ordering of such steps, receptions, and transmissions may vary where appropriate without negating the purpose and advantages of the examples set forth in detail throughout the remainder of this disclosure.

The computing device executing process 300 may be a same or similar computing device to computing device 200 of FIG. 2, and may include an edge device same or similar to any one or more of the recording devices 104, 114, 124 illustrated in FIG. 1, and/or may include an infrastructure device same or similar to the controller 156 of FIG. 1. Accordingly, a recording device generating the audio and/or audio/video at step 302 may also be the device processing the audio and/or audio/video, or the recording device generating the audio and/or audio/video at step 302 may wirelessly or wiredly transmit the generated audio or audio/video stream to another computing device node for further processing. Other combinations are possible as well.

Process 300 begins at step 302 where the computing device receives, from a first electronic audio source, first audio content. The first audio content may be in the form of a data file received at the first electronic audio source as an uncompressed or compressed digital audio file created at the first electronic audio source, or may be in the form of an audio channel multiplexed with video in a compressed or uncompressed multimedia audio/video file. Additionally or alternatively, the first audio content may be in the form of an audio signal received over a circuit or packet switched network from the first electronic audio source and that is then recorded at the computing device into an uncompressed or compressed digital audio file. Other possibilities exist as well.

As mentioned earlier, the first electronic audio source may be any fixed or mobile audio recording device in a matrix of a plurality of recording devices for tracking particular language speakers as they move across a geographic region of interest.

Figure 4:
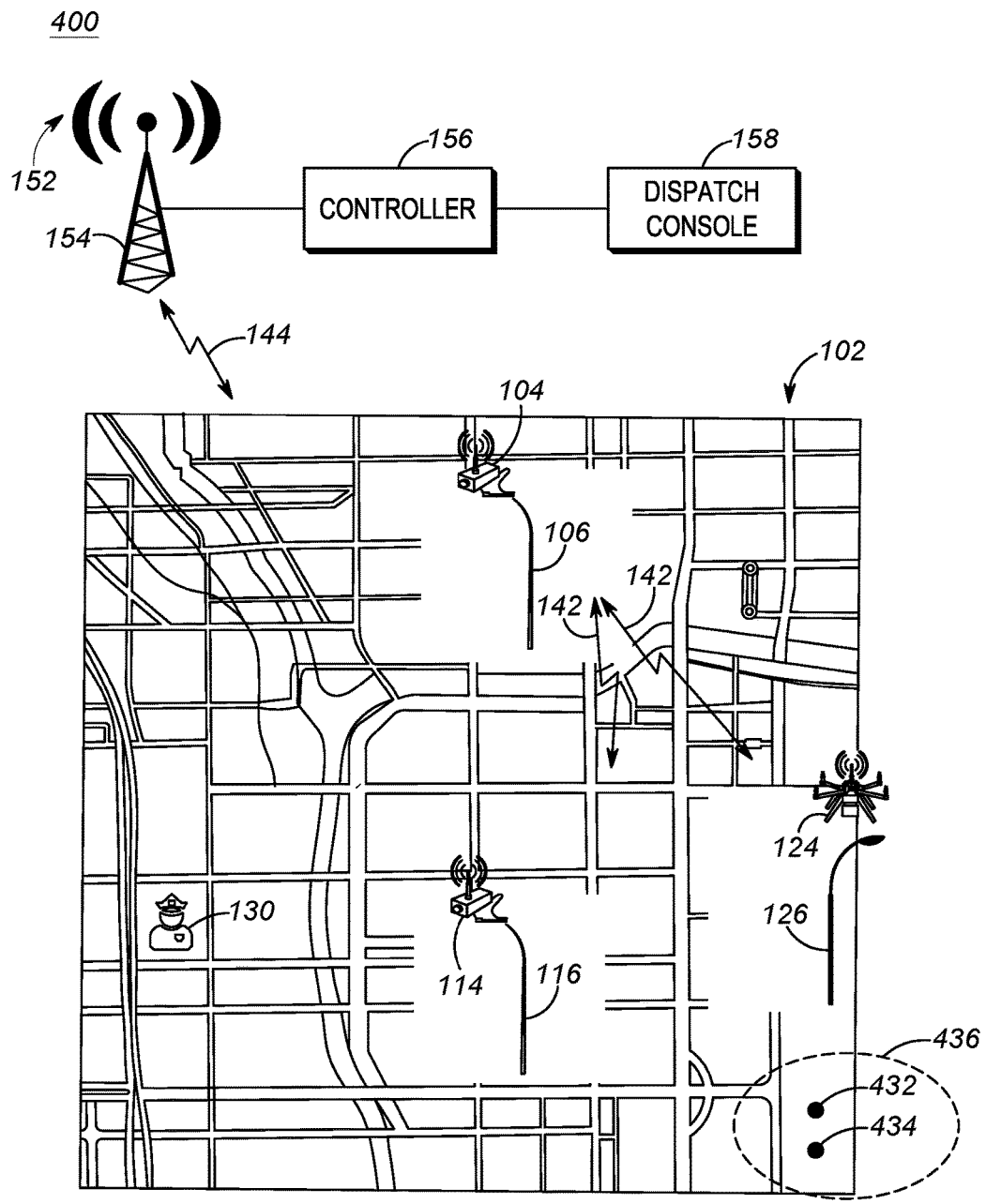
FIGS. 4-6 are system diagrams illustrating language detection of moving groups of language-specific speakers and corresponding creation and/or modification of a real-time language heat-map data structure in accordance with some embodiments.
Figure 5:
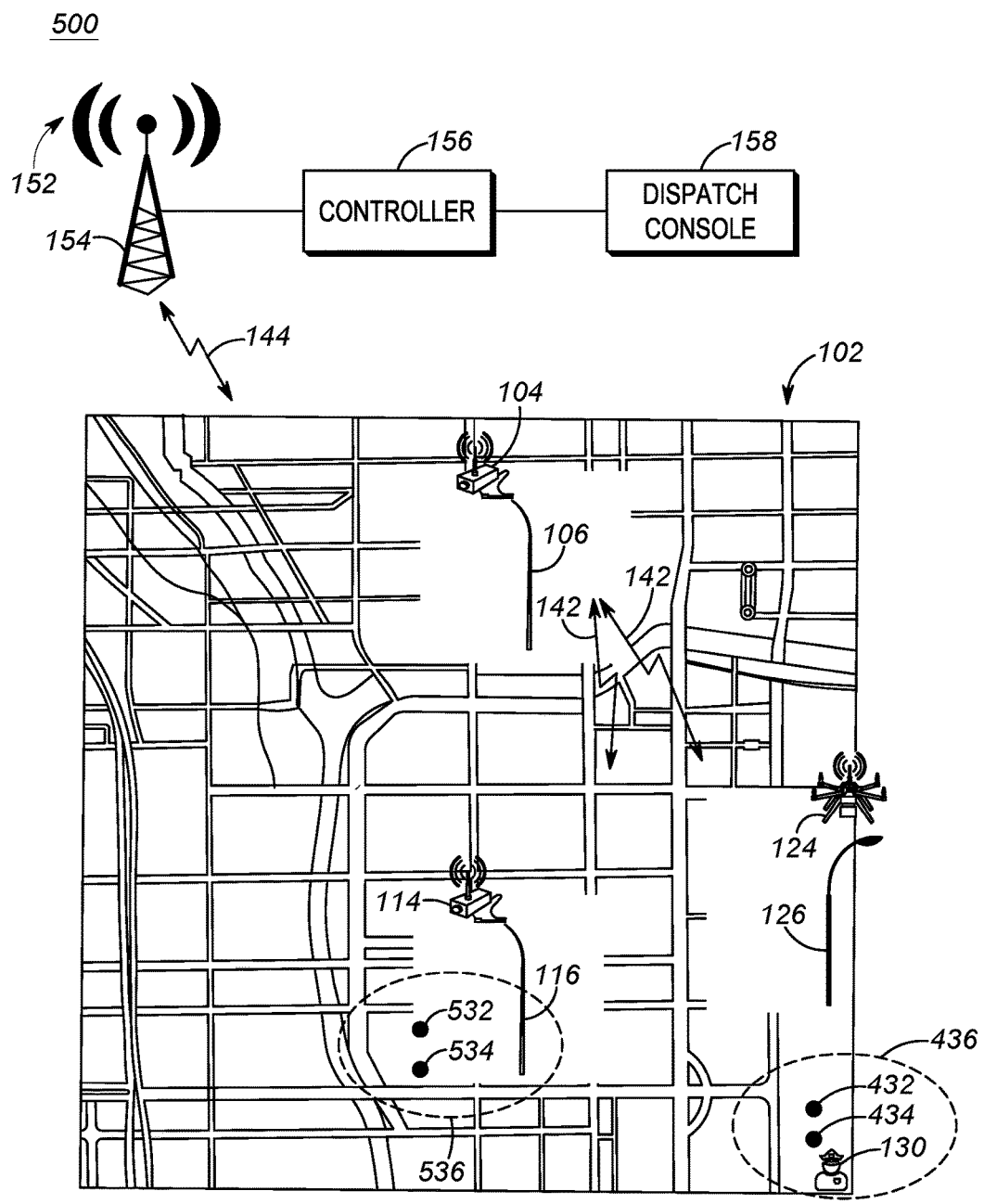
Figure 6:
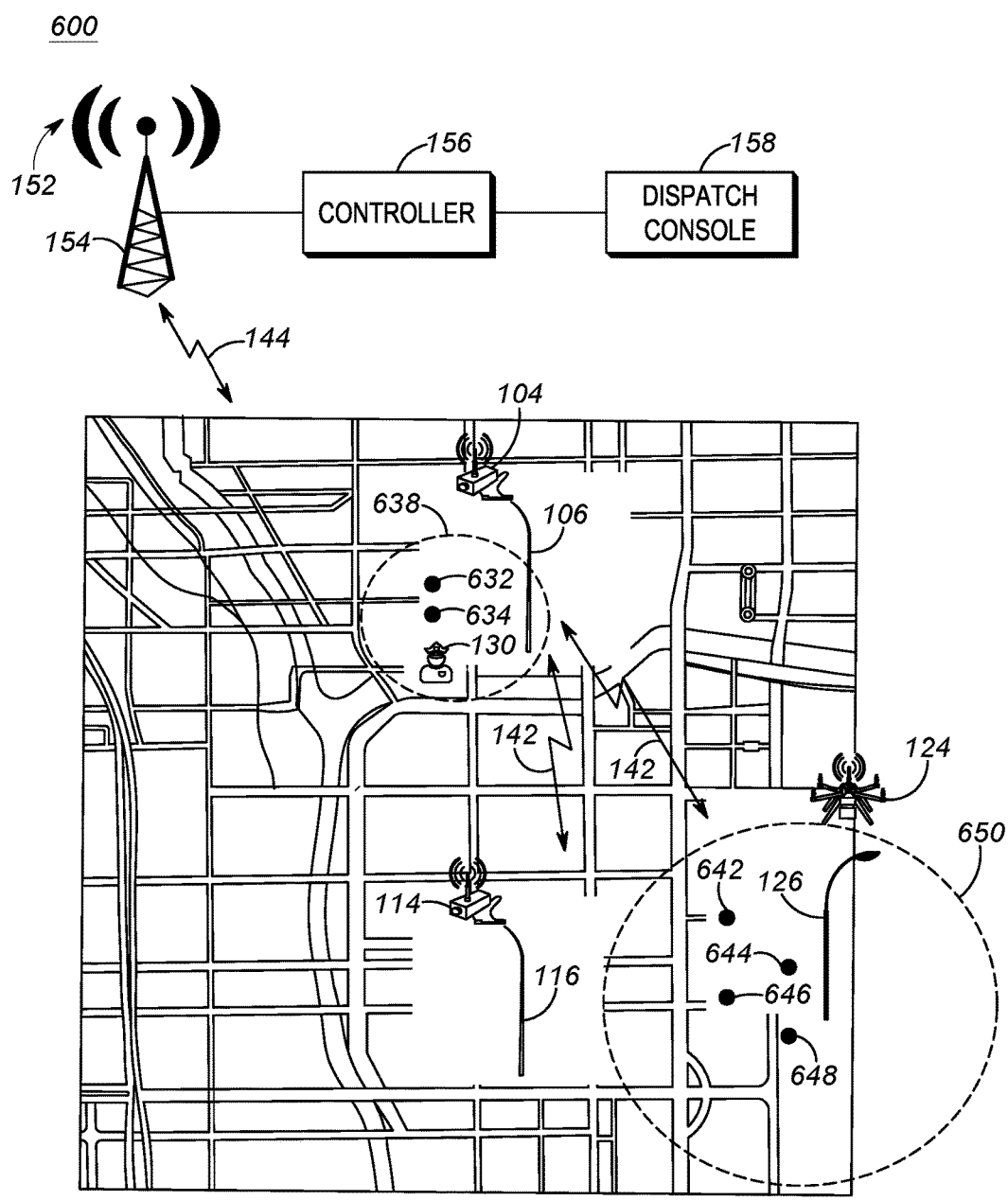

FIGS. 4-6 sets forth example system diagrams illustrating detection of moving groups of language-specific speakers and corresponding creation and/or modification of a real-time language heat-map data structure in accordance with the process 300 set forth in FIG. 3. FIG. 4, in particular, illustrates a system 400 inheriting many of the components of system 100 of FIG. 1, and their description is not repeated here. System 400 shows the new introduction, relative to system 100, of two first new-language speakers 432, 434 that have entered a geographic area associated with the third mobile audio or audio/video recording device 124 hovering over or temporarily affixed to the third street lamp 126. As one example, and commensurate with step 302 of FIG. 3, third mobile audio or audio/video recording device 124 may capture audio from each of the two first new-language speakers 432, 434 and, captured together or captured separately, provide the captured audio as first audio content (and/or second audio content if captured separately) for receipt by the controller 156 in the RAN 152.

Returning to FIG. 3, at step 304, the computing device identifies a first geographic location of the first audio content as a function of a location of the first electronic audio source. As set forth earlier, the geographic location identified at step 304 may be a geographic region on a cartographic map, may be a particular room, hallway, or aisle within a commercial building, retail establishment, or other type of structure, may be a particular jurisdiction or patrol beat associated with a first responder, or may be an absolute location (e.g., latitude and longitude, polar coordinate, or room or hallway identifier) or a relative location (e.g., northwest, southwest, northeast, etc.) relative to an absolute location.

The location information may be provided by the recording device itself and provided accompanying, prior to, or after the audio content received at step 302 (e.g., via a Global Positioning System (GPS) receiver provided at the recording device itself), or may be a network-determined location perhaps identified via a time difference of arrival (TDOA) mechanism implemented across multiple geographically displaced base stations/access points that receive the signal including the first audio content at step 302.

In still other embodiments, a hard-coded location of a fixed recording device recording the first audio content and then providing the recorded audio content to the computing device (e.g., and such that the fixed recording device can be identified as the source of the content via its unique network address or via some other mechanism) may be used as the first geographic location. In still other embodiments, an array of microphones at the fixed recording device may provide additional directional and/or ranging information that may also be provided to the computing device, perhaps in addition to an absolute or relative location of the first electronic audio source, for further distinguishing a location and/or movement of a source/speaker of the first audio content.

In still other embodiments, a hard coded location associated with a wireless access point or base station receiving the first audio content from the first electronic audio source and subsequently forwarding the first audio content to the computing device may be used as the first geographic location. Other possibilities exist as well.

The first geographic location identified at step 308 may determine how the received first audio content is further handled at the computing device. For example, the computing device may cross-reference the first geographic location identified at step 308 with a public/private database of locations and determine if the first geographic location (e.g., the location of the first electronic audio source, the location of the base station wirelessly receiving the audio content, and/or the location of the speaker(s) that generated the first audio content) was in a public or a private location. The computing device may then be configured, based on jurisdictional law of the jurisdiction in which it is located, to only store the first audio content when it is determined that the first geographic location was located within a public place (e.g., a public street, sidewalk, or park). If, on the other hand, the computing device determines that the first geographic location was located within a private space (e.g., a private residence, a private building, or a private yard or park), the first audio content may be immediately discarded, or may be used for remaining steps of process 300 and then immediately discarded, depending on configuration. In still other embodiments, the first audio content captured via a first geographic location located within a private space may be encrypted with authorization locks and a chain of custody information applied to the encrypted digital audio data until a point in time at which a warrant is secured and the contents of the digital audio data may be unencrypted and made accessible to authorized users.

Of course, in other embodiments, the computing device may be configured to store all audio content received at step 302 and/or identified as containing a first language at subsequent steps of process 300, or may be configured to discard all audio content received at step 302 after the remaining steps of process 300 are completed. In some embodiments, computing device may be modifiable between different modes depending on whether an incident is or has occurred in an area associated with the first geographic location, and may transition from a store-nothing mode or context-dependent mode (e.g., public space vs. private space determination mode) to a maximum storage (e.g., store everything) mode in the event of a detected incident in the area, and may then transition back to the store-nothing mode or context-dependent mode once the incident has been resolved. Other possibilities exist as well.

Additional information may be identified and/or electronically stored at step 304 as well. For example, a time and/or date at which the first audio content was first captured (and, e.g., provided to the computing device by the first electronic audio source itself) may be identified and/or stored by the computing device at step 304. In other embodiments, a time and/or date at which the computing device received the first audio content may be identified and/or stored by the computing device at step 304. As another example, and in those embodiments in which the first electronic audio source includes an array of microphones, directional information may also be provided by the first electronic audio source to the computing device and stored by the computing device at step 304. Other information could be included as well.

Turning again to system 400 of FIG. 4, after providing the first audio content to the controller 156, controller 156 may, and commensurate with step 304 of FIG. 3, identify a first geographic location of the first audio content as a function of the location of the first electronic audio source. If the first audio content of both of the two first new-language speakers 432, 434 were provided together, the first geographic location may be a determined geographic location of the third mobile audio or audio/video recording device 124 itself (as determined via a GPS unit embedded within the third mobile audio or audio/video recording device 124 and provided to the controller 156), or may be a triangulated determined position of the third mobile audio or audio/video recording device 124 as determined via a plurality of fixed terminals (not shown in FIG. 4). Additionally or alternatively, the first geographic location may be a determined averaged geographic location of the first new-language speakers 432, 434, perhaps determined via a microphone array at the third mobile audio or audio/video recording device 124 capable of directional ranging, and offset from the third mobile audio or audio/video recording device's 124 own determined location. Other possibilities exist as well. In the event that the separate first and second audio content is generated at the third mobile audio or audio/video recording device 124 for each of the first new-language speakers 432, 434 and provided to the controller 156, separate first and second geographic locations of the first and second audio contents may be identified at the controller 156 in a same or similar manner to that set forth above.

In this example, the controller 156 determines that the first new-language speakers 432, 434 themselves (and/or the third mobile audio or audio/video recording device 124 itself) are within a public space, and thus the first audio content can be stored.

Returning to FIG. 3, at step 306, the computing device determines that the first audio content includes first speech audio. Various known voice activity detectors may be used to identify if the first speech audio contains speech, such as time-domain voice activity detection algorithms including a linear or adaptive linear energy-based detector, or a weak fricatives detector; or such as frequency-domain voice activity detection algorithms including a linear sub-band emergency detector or a spectral flatness detector. As one particular example, an ITU-T G.729 Annex B voice activity detector may be used. If, instead, no speech audio were detected at step 306, processing may continue back to step 302 and a new audio content received and inspected for speech audio.

In the event that first speech audio is detected at step 306, the computing device may also process the first speech audio to identify whether the first speech audio is from a single speaker or is an amalgamation of multiple speakers. In the latter case, the first audio content may be modified to separately extract each of the multiple speakers into separate audio content files for separate processing throughout the remainder of process 300. Various speech processing parameters may be used to identify and extract multiple speakers and their associated speech audio from the first audio content, such as distinguishing speakers based on one or more of differences in pitch, tone, speed, emotion, dialect, accent, prosody, and word complexity.

Turning again to system 400 of FIG. 4, after identifying the first geographic location of the first audio content, controller 156 may, and commensurate with step 306 of FIG. 3, determine that the first audio content includes first (and/or second) speech audio spoken by one (or both) of first new-language speakers 432, 434 and as captured by the third mobile audio or audio/video recording device 124.

Processing then proceeds to step 308 of FIG. 3, where the computing device identifies, from the first audio content, a first language in which the first speech audio is spoken and creates a first association between the first geographic location identified at step 304 and the first language identified at step 308. Various language identification algorithms have been used to identify a particular language used in speech. For example, language identification systems using predefined spectral analysis of predefined common words in various languages have been used to differentiate and identify spoken languages. As other examples, hidden Markov models trained using phonetic training sets identifying stop and fricative consonants, vowels, and silence patterns have been used to distinguish spoken languages. Other models using other phonetic features, such as consonantal place of articulation, nasality, and lip rounding have been developed as well. As still other examples, neural network machine learning models trained on various languages have been used to identify various spoken languages. In doing so, some of these models may further identify one or more of a gender, emotion, dialect, accent, and prosody associated with the first audio content, which may be further electronically stored in a real-time language heat-map data structure in subsequent steps or stored in some other data structure.

In some embodiments, only certain identified languages of interest may be sought at step 308, and if a language that is not of interest is identified, process 300 may end or return to step 302 and process another audio content. For example, a database of languages of interest (or a database of languages of no interest) may be accessed at step 308 after identifying the first language, and process 300 may only proceed if the first language is included in the database of languages of interest (or only proceed if the first language is not included in the database of languages of no interest). In some embodiments, the database of languages of (no) interest may be populated such that only languages other than an identified dominant language spoken in one of a store, jurisdiction, region, county, city, state, country, or continent in which the first geographic location is located are of interest. For example, only languages other than English, which may be the dominant language in a particular region, may be identified as of interest. This filtering step could be further expanded to identify particular accents or dialects of interest (or filter out particular accents or dialects of non interest) as well.

Once the first language is identified at step 308, the computing device creates a first association between the first geographic location identified at step 304 and the first language identified at step 308. For example, an association may take the form of a linking of the two together in a linked list or table, such as the one set forth below in Table I. An arbitrary identifier may be generated and associated with each distinct speaker and location identified as associated with the first audio content, and the identified first geographic location and the first language stored in the association. While Table I sets forth latitude and longitude coordinates for its location, in other embodiments, other types of location information including street addresses, intersections, or polar coordinates could be used. Further, and while the language spoken entry is written in word-form, in other embodiments, index values associated with particular languages could be used instead. In some embodiments, the computing device may store a spectral sample of each uniquely detected speaker in an attempt to avoid creating multiple associations for a same speaker (e.g., without storing a substantial portion such as more than one word of audio content, or without storing any portion of the content of the audio content). While only one language is set forth in Table I, in other embodiments where a same speaker is detected speaking multiple languages, corresponding multiple languages may be indicated in the stored association.

TABLE I

Language and Location Association Example

| Speaker ID | Location | Language(s) Spoken |
|---|---|---|
| 0x0003 | 41°52'50.2"N 87°38'24.3"W | Spanish |

Turning again to system 400 of FIG. 4, after determining that the first audio content includes first speech audio (and/or second speech audio) at step 306, controller 156 may, and commensurate with step 308 of FIG. 3, identify a first language in which the first speech audio is spoken. For example, and assuming that the first speech audio captured at the third mobile audio or audio/video recording device 124 includes separate speech from each of the first new-language speakers 432, 434, the controller 156 may apply a speech identification function as set forth above and identify two different speakers in the first speech audio (e.g., corresponding to each of the first new-language speakers 432, 434) and for each of the identified two different speakers, identify a spoken language for each. In this case, we will assume that each of the first new-language speakers 432, 434 is speaking the Spanish language, and the controller 156 identifies the first language in the first audio content as Spanish and may accordingly electronically store two separate associations (e.g., creating two separate speaker identifiers and associating the location with each of the two Spanish-language speakers) in a manner similar to that set forth in Table I above.

Returning to FIG. 3, at step 310, the computing device modifies a real-time language heat-map data structure to include the created first association. The real-time language heat-map data structure may take the form of a table or linked list that is a super-set of the table set forth in Table I above, or may take the form of a relational or non-relational database, among other possibilities.

TABLE II

Real-Time Language Heat-Map Data Structure Example

| Speaker ID | Location | Language(s) Spoken | Time |
|---|---|---|---|
| 0x0001 | 42°03'46.7"N 88°03'11.4"W | Dutch | 21:10 |
| 0x0002 | 42°03'46.7"N 88°03'11.4"W | Dutch | 21:11 |
| 0x0003 | 41°52'50.2"N 87°38'24.3"W | Spanish | 22:05 |
| 0x0004 | 41°52'50.2"N 87°38'24.3"W | Spanish | 22:06 |

As set forth in Table II above, in addition to the speaker ID, location, and language spoken parameters stored in the associations above in Table I, the real-time language heat-map data structure may include a timestamp for each entry to aid in maintaining the real-time nature of the data structure. The time indicated in the real-time language heat-map data structure may be a time at which the electronic audio source associated with the entry first started generating the audio content associated with the entry, may be a time that the computing device received the audio content associated with the entry, may be a time that the wireless base station received the audio content, or may be a time that the entry was created in the data structure, among other possibilities. The time entry may be used to decay the data in the data structure such that association entries in the real-time language heat-map data structure are removed once they become aged beyond a threshold value, such as 5, 10, 30, or 60 minutes, among other possibilities. In some embodiments, if the same speaker is detected again speaking the same particular language, the time may be updated so that the association remains in the data structure again for the threshold period of time after the second detection.

In other embodiments, entries may not be removed from the real-time language heat-map data structure, but instead, similar filtering applied in a subsequent step, such as step 312, to only take further action based on entries having a timestamp occurring within the threshold period of time in the past relative to the current time.

In some embodiments, entries removed from the real-time language heat-map data structure may be moved to a historical language heat-map data structure, or to a particular historical language heat-map data structure associated with the time and, date, spoken language, and/or first location. Other possibilities exist as well.

Turning again to system 400 of FIG. 4, after identifying the first language in which the first speech audio is spoken and creating the first association at step 308, controller 156 may, and commensurate with step 310 of FIG. 3, modify a real-time language heat-map data structure to include the created first association.

For example, and assuming that the first speech audio captured at the third mobile audio or audio/video recording device 124 includes separate speech from each of the first new-language speakers 432, 434 identified to be in the Spanish language and captured at approximately 22:05 (10:05 pm), the controller 156 may modify the real-time language heat-map data structure to include the new associations and times from step 308 (e.g., new entries 0x0003 and 0x0004 as set forth in Table II above).

Returning to FIG. 3, at step 312, the computing device takes a further action as a function of the modified real-time language heat-map data structure. The further action taken could be configurable and could be in the form of an electronic transmission, electronic transformation of the underlying data into an electronic display format to convey the information in a more visual electronic format, and a further electronic modification of the data structure, among other possibilities.

In one embodiment, the further action consists of electronically displaying the modified real-time language heat-map data structure at an electronic display coupled to the computing device. The underlying data from the modified real-time language heat-map data structure may be transformed in some manner to aid in a more efficient transfer of knowledge via the electronic display. For example, clusters of different languages spoken may have their relative geographic areas visually distinctly shaded or colored in a manner that identifies the spoken language associated with the distinct cluster of speakers (e.g., within the threshold period of time to retain the real-time nature of the data). For example, a geometric shape that incorporates each of the locations speaking a particular language may be colored or shaded to indicate the general locations of that particular type of language speaker.

In some embodiments, while still within the threshold period of time, the vibrancy or boldness of the color or thickness or density of the shading may be made to fade or increase or decrease over time to indicate how old the displayed location and language association information is.

In other embodiments, the further action may include transmitting the modified real-time language heat-map data structure to the another electronic computing device for further processing and/or display. For example, the computing device, after modification of the data structure, may wiredly or wirelessly transmit the modified data structure to another client radio, laptop, tablet, vehicle console, dispatch console, or computer aided dispatch (CAD) computing device, among other possibilities.

In still further embodiments, the further action may include the computing device, or the another electronic computing device, transmitting a dispatch instruction to a user having a skill or need in the first language to the first geographic location. In some embodiments where a match between language skills is desired perhaps in order to allow the dispatched user to better aid the language speakers at the first geographic location or to better sell products or services to the language speakers at the first geographic location, a database of nearby users (e.g., employees, salesmen, service providers, or first responders) available for dispatch and having a matching language skill to the detected language(s) at the first geographic location may be accessed and, once a matching available user for dispatch is identified, may be provided the first geographic location accompanying an instruction to travel to the first geographic location.

In some embodiments where a match between language skills is desired perhaps in order to match a need expressed by a user to obtain a translation or local particular-language communication skill, (e.g., perhaps in response to the computing device receiving a request from a requesting user such as a first responder or police officer specifying a particular need for translation or local particular-language speakers and specifying the language), the computing device may access the modified real-time language heat-map data structure to match a closest (or highest number, or some combination thereof) set of one or more speakers matching the requested language and transmit a dispatch instruction to the requesting user identifying the location of the matching set of one or more speakers. The dispatch instruction may include the number of speakers identified and the last time that speakers speaking that language were captured and identified.

In some embodiments where the requesting user requests a historical plot of a movement of a particularly identified language-speaker(s) across a geographic area, the further action at step 312 may include accessing the historical language heat-map data structure that includes a plurality of associations across sequential times and/or dates that track a particular language cluster as it moves across a geographic region (perhaps in addition to or instead of the real-time language heat-map data structure) to identify how a particular cluster of particular-language speakers moved across a traceable geographic area of time. That movement may then be electronically displayed and/or transmitted to the requesting user for display via a time-stamped path (or other display mechanism) that shows how the cluster of one or more particular-language speakers moved across a traceable geographic area of time via a matrix of electronic audio sources spread across the geographic area.

Turning again to system 400 of FIG. 4, after modifying the real-time language heat-map data structure to include the created first association at step 310, controller 156 may, and commensurate with step 312 of FIG. 3, take a further action as a function of the modified real-time language heat-map data structure. For example, assuming user 130 is determined to have Spanish-speaking skills (via a user to language skill database lookup performed by or at the request of the computing device), the computing device may transmit a dispatch request to the user's 130 electronic computing device indicating the need for Spanish-language assistance at a geographic location associated with first new-language speakers 432, 434. The dispatch request may include an indication of location(s) of the first new-language speakers 432, 434 (which, as noted above, may be determined in any one or more of several different manners) and may include a location uncertainty geometric shape 436 indicator indicative of an uncertainty of further movement of the first new-language speakers 432, 434 after being detected at step 302 (and the outline of which may grow over time to indicate uncertainty as to whether the first new-language speakers 432, 434 have further moved absent further capture of their speech) and may further include an indication of the particular Spanish-language skill needed to match the identified first language. This further movement may be confirmed or refuted by microphones or cameras in the projected area of movement. The lack of microphones or cameras in the projected area of movement may be used to continue to show the area of uncertainty. In some embodiments, the dispatch request may also include a time at which the first audio content was captured and an identity of the device that captured it (in this case, the third mobile audio or audio/video recording device 124). In still other embodiments, the dispatch request may also include a copy of or a link to the first audio content (assuming it was stored in accordance with the foregoing description) so that the user 130 may playback the first audio content before responding.

In another example, the further action may include the controller 156 providing the modified real-time language heat-map data structure to the dispatch console 158 for further transformation and display at an electronic display coupled to the dispatch console 158 (or directly providing transformed underlying data from the real-time language heat-map data structure to the dispatch console 158 for display) that may subsequently display, for example, indicators for the first new-language speakers 432, 434 and a location uncertainty geometric shape 436 as illustrated in FIG. 4 to a dispatcher at the dispatch console. The indicators for the first new-language speakers 432, 434 and/or the location uncertainty geometric shape 436 may be colored, shaped, shaded, labeled, or otherwise uniquely electronically displayed so as to associate the indicator with the particular language detected (Spanish in this case). What's more, activation of any one or more the indicators for the first new-language speakers 432, 434 and/or the location uncertainty geometric shape 436 may cause, in response to activation, playback of the first audio content (assuming it was stored in accordance with the foregoing description) so that the dispatcher may listen to the first audio content before responding or otherwise dispatching users. In embodiments in which one or more same speakers are detected speaking multiple languages, a unique color, shape, shading, label, etc. may be used indicative of the particular combination of languages (e.g., Spanish and English associated with one unique indicator type, while French and Dutch associated with another unique indicator type).

In another example, and instead of playing back the first audio content, activation of the indicator may cause a live audio stream to be played back from the electronic audio source that generated the first audio content associated with the first new-language speakers 432, 434 so that the dispatcher may determine whether the first new-language speakers 432, 434 may still be in the vicinity of the first geographic location. In any event, the dispatcher may then use this visual information to further dispatch or aid users such as user 130 relative to the first new-language speakers 432, 434. Other possibilities exist as well.

Returning to FIG. 3, at step 314, process 300 may be repeated for a second audio content from a second electronic audio source and/or still subsequent audio content from subsequent electronic audio sources. For example, the computing device may further receive, from a second electronic audio source, second audio content. The computing device may then identify a second geographic location, different from the first geographic location, of the second audio content as one of a location of the second electronic audio source and a sound localization process calculated as a function of the location of the second electronic audio source. The computing device may then determine that the second audio content includes second speech audio, and identify, from the second audio content, a second language in which the second speech audio is spoken and may create a second association between the second geographic location and the second language. Subsequently, the computing device may modify the real-time language heat-map data structure to include the created second association and take a second further action as a function of the further modified real-time language heat-map data structure including one of: (i) electronically displaying the further modified real-time language heat-map data structure at the electronic display coupled to the electronic computing device, (ii) transmitting the further modified real-time language heat-map data structure to the another electronic computing device for further processing, (iii) electronically transmitting a dispatch instruction to a second user having a second skill or a second need in the second language to the second geographic location, and (iv) electronically transmitting a notification to a second user having a second skill or a second need in the second language including identifying the second geographic location and the second language.

For example, and as illustrated in the system 500 of FIG. 5, after process 300 is run for a second time and after user 130 is dispatched to the first geographic location associated with first new-language speakers 432, 434, the computing device may detect second new-language speakers 532, 534 at a second geographic location via second audio content captured by second audio or audio/video recording device 114 affixed to the second street lamp 116. A similar second location uncertainty geometric shape 536 may be cause to be displayed relative to second new-language speakers 532, 534. In the event that the computing device can determine that second new-language speakers 532, 534, perhaps via stored voice profiles, are the same as first new-language speakers 432, 434, the computing device may remove associations associated with the first new-language speakers 432, 434 from the real-time language heat-map data structure (and, in some embodiments, may move such associations to a historical language heat-map data structure), and may provide a notification to user 130 that a new location exists for the first new-language speakers 432, 434.

In other embodiments where the computing device cannot determine that the second new-language speakers 532, 534 are the same as first new-language speakers 432, 434, the computing device may refrain from removing associations associated with the first new-language speakers 432, 434 from the real-time language (at least until, perhaps, a threshold time period is reached in accordance with the foregoing).

As a further example, and as illustrated in the system 600 of FIG. 6 after process 300 is run for a third time and after a threshold period of time since associations associated with first and second new-language speakers 432, 434, 532, 534 were created has passed (and were thus removed from the real-time language heat-map data structure), the computing device may detect third new-language speakers 632, 634 at a third geographic location via third audio content captured by third audio or audio/video recording device 104 affixed to the third street lamp 126. A similar third location uncertainty geometric shape 638 may be displayed relative to third new-language speakers 632, 634. In the event that the computing device can determine that third new-language speakers 632, 634, perhaps via stored voice profiles, are the same as first and second new-language speakers 432, 434, 532, 534, the computing device may provide a notification to user 130 that a new location exists for the first and second new-language speakers 432, 434, 532, 534.

Also while process 300 is run for a third time, the computing device may detect fourth new-language speakers 642-648 at the first geographic location via fourth audio content captured by first audio or audio/video recording device 124. A similar but larger fourth location uncertainty geometric shape 650 may be displayed relative to fourth new-language speakers 642-648.

In some embodiments, process 300 may be executed responsive to a determination by the computing device that a geographic gap in language-specific information exists in the real-time language heat-map data structure, and one or more mobile audio or audio/video recording devices such as the third mobile audio or audio/video recording device 124 may be automatically deployed to fill in the identified gaps in the, the computing device electronically dispatching the one or more mobile audio or audio/video recording devices to identified locations within the gaps and, responsive to receiving audio content from the deployed mobile audio or audio/video recording devices, filling in the gaps with newly created associations consistent with process 300.

In some embodiments, a language detection request may be entered into or received at the computing device requesting that when a certain language (or combination thereof) is detected at a particular geographic region (or sequence of regions), that a notification be provided to one or more of an officer initiating or entering the request, a dispatcher associated with the request or a dispatcher on duty, or some other employee or salesman within an organization associated with the particular geographic area. In this example, and when a language detection matching the request is detected via steps 302-310, the further action taken at step 312 may include transmitting a notification of a match to the language detection request. For example, the language detection request may be initiated as part of an ongoing case, situation, or incident, and may include an identity of the language or languages and the geographic area or areas to match to. In still other embodiments, particular geographic areas may be assigned, or may build up over time, an identity of 'expected' languages in the area, and the computing device may be configured to generate and/or transmit a notification is a same or similar manner to that set forth above when an unexpected or anomalous language speaker is detected. Other variations are possible as well.

3. Conclusion

In accordance with the foregoing, disclosed is an improved method, device, and system for real-time language detection and real-time language heat-map data structure creation and/or modification via a deployed matrix of audio recording devices and that is indicative of various detected groups of spoken language speaker(s) in real-time across a geographic region such as a city neighborhood or a retail or commercial real estate campus, such that further automated and intelligent actions can be taken to support detected language-specific speakers or to derive further benefit from detected language-specific speakers.

As a result, a more accurate representation of language speakers across a geographic region can be automatically established and transmitted or displayed, and specific-language skills matched with specific-language needs in dispatching users to locations associated with the identified language speakers. The technical problem of efficiently and consistently matching such needs and skills across geographic regions in which many different languages may be spoken, and in efficiently dispatching users having particular language-specific skills to areas in which their skills are needed in a prioritized manner, can be effectively technologically addressed, empowering public safety, retail, and commercial agencies to better support employees and customers having varied language proficiencies and language needs and improving services provided to non-native language speakers.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method of real-time language detection and language heat map data structure modification, the method comprising:
    receiving, at an electronic computing device from a first electronic audio source, first audio content;
    identifying, by the electronic computing device, a first geographic location of the first audio content as one of a location of the first electronic audio source and a sound localization process calculated as a function of the location of the first electronic audio source;
    determining, by the electronic computing device, that the first audio content includes first speech audio;
    identifying, by the electronic computing device from the first audio content, a first language in which the first speech audio is spoken and creating a first association between the first geographic location and the first language;
    accessing, by the electronic computing device, a real-time language heat-map data structure including at least a second association between the first geographical location and a second language different from the first language;
    modifying, by the electronic computing device based on the first audio content, the real-time language heat-map data structure to include the created first association;
    taking a further action, by the electronic computing device, as a function of the modified real-time language heat-map data structure comprising at least one of: (i) electronically displaying at least a modified portion of the modified real-time language heat-map data structure at an electronic display coupled to the electronic computing device, (ii) transmitting at least the modified portion of the modified real-time language heat-map data structure to another electronic computing device for further processing, (iii) electronically transmitting a dispatch instruction to a user having a skill or a need in the first language to the first geographic location, and (iv) electronically transmitting a notification to a user having a skill or a need in the first language including identifying the first geographic location and the first language;
    identifying a time and/or date associated with receipt of the first audio content; and
    modifying a historical language heat-map data structure associated with the time and/or date to include the first association, wherein the historical language heat-map data structure includes a plurality of associations across sequential times and/or dates that track a particular language cluster as it moves across a geographic region.

2. The method of claim 1, wherein the further action consists of electronically displaying the modified real-time language heat-map data structure at the electronic display coupled to the electronic computing device.

3. The method of claim 2, wherein displaying the modified real-time language heat-map data structure comprises displaying clusters of different languages spoken as visually distinct clusters over an underlying cartographic map, each visually distinct cluster shaded or colored in a manner that identifies the language spoken associated with the distinct cluster, and each distinct cluster representative of a plurality of distinct speech audios determined to be spoken in the associated language spoken within a threshold period of time.

4. The method of claim 3, wherein each of the plurality of distinct speech audios is distinguished by comparing one or more of pitch, tone, speed, and word complexity to identify different speakers using the same associated language spoken.

5. The method of claim 1, wherein the further action consists of transmitting the modified real-time language heat-map data structure to the another electronic computing device for further processing.

6. The method of claim 1, wherein the further action consists of electronically transmitting a dispatch instruction to the user having the skill or the need in the first language to the first geographic location.

7. The method of claim 6, wherein the further action consists of electronically transmitting the dispatch instruction to the user having the skill in the first language to the first geographic location, the method further comprising selecting the user having the skill by accessing a database of language skills mapped to user identifiers using the first language and wherein the user is a retail employee and the first audio content is captured at a retail or sales establishment at which the retail employee is employed or selling, respectively.

8. The method of claim 6, wherein the further action consists of electronically transmitting the dispatch instruction to the user having the skill in the first language to the first geographic location, the method further comprising selecting the user having the skill by accessing a database of language skills mapped to user identifiers using the first language and wherein the user is a first responder and the first audio content is captured within a jurisdiction associated with the first responder.

9. The method of claim 6, wherein the further action consists of electronically transmitting the dispatch instruction to the user having the need in the first language to the first geographic location, wherein the user is a first responder officer, and the first geographic location provides a source of language translations requested by the first responder officer.

10. The method of claim 1, wherein the further action consists of electronically transmitting the notification to the user having the skill or the need in the first language including identifying the first geographic location and the first language.

11. The method of claim 1, the method further comprising after creating the first association between the first geographic location and the first language, not storing, but instead discarding, the first audio content.

12. The method of claim 1, the method further comprising:
   determining whether the first geographic location is within a public or a private space;
   when the determination is that the first geographic location is within the private space, not storing, but instead discarding, the first audio content; and
   when the determination is that the first geographic location is within the public space, storing the first audio content.

13. The method of claim 1, the method further comprising:
   receiving, at the electronic computing device from a second electronic audio source, second audio content;
   identifying, by the electronic computing device, a second geographic location, different from the first geographic location, of the second audio content as one of a location of the second electronic audio source and a sound localization process calculated as a function of the location of the second electronic audio source;
   determining, by the electronic computing device, that the second audio content includes second speech audio;
   identifying, by the electronic computing device from the second audio content, a third language in which the second speech audio is spoken and creating a third association between the second geographic location and the third language;
   further modifying, by the electronic computing device from the second audio content, the real-time language heat-map data structure to include the created third association; and
   taking a second further action, by the electronic computing device, as a function of the further modified real-time language heat-map data structure comprising at least one of: (i) electronically displaying the further modified real-time language heat-map data structure at the electronic display coupled to the electronic computing device, (ii) transmitting the further modified real-time language heat-map data structure to the another electronic computing device for further processing, (iii) electronically transmitting a dispatch instruction to a second user having a second skill or a second need in the third language to the second geographic location, and (iv) electronically transmitting a notification to a second user having a second skill or a second need in the third language including identifying the second geographic location and the third language.

14. The method of claim 1, further comprising, after a threshold period of time (i) after modifying the real-time language heat-map data structure to include the created first association, modifying the real-time language heat-map data structure to remove the created first association or (ii) after failing to identify the first language in any further speech audio received from the first electronic audio source at the first geographic location, modifying the real-time language heat-map data structure to remove the created first association.

15. The method of claim 1, wherein the real-time language heat-map data structure is only modified for identified languages other than an identified dominant language spoken in one of a store, jurisdiction, region, county, city, state, country, or continent in which the first geographic location is located.

16. A method of real-time language detection and language heat map data structure modification, the method comprising:
   receiving, at an electronic computing device from a first electronic audio source, first audio content;
   identifying, by the electronic computing device, a first geographic location of the first audio content as one of a location of the first electronic audio source and a sound localization process calculated as a function of the location of the first electronic audio source;
   determining, by the electronic computing device, that the first audio content includes first speech audio;
   identifying, by the electronic computing device from the first audio content, a first language in which the first speech audio is spoken and creating a first association between the first geographic location and the first language;
   accessing, by the electronic computing device, a real-time language heat-map data structure including at least a second association between the first geographical location and a second language different from the first language;
   modifying, by the electronic computing device based on the first audio content, the real-time language heat-map data structure to include the created first association;
   taking a further action, by the electronic computing device, as a function of the modified real-time language heat-map data structure comprising at least one of: (i) electronically displaying at least a modified portion of the modified real-time language heat-map data structure at an electronic display coupled to the electronic computing device, (ii) transmitting at least the modified portion of the modified real-time language heat-map data structure to another electronic computing device for further processing, (iii) electronically transmitting a dispatch instruction to a user having a skill or a need in the first language to the first geographic location, and (iv) electronically transmitting a notification to a user having a skill or a need in the first language including identifying the first geographic location and the first language;
   identifying a time and/or date associated with receipt of the first audio content; and
   modifying a historical language heat-map data structure associated with the time and/or date to include the first association, wherein the historical language heat-map data structure includes a plurality of associations across sequential times and/or dates that track a particular language cluster as it moves across a geographic region.

17. The method of claim 1, wherein the first electronic audio source is (i) an input transducer in an array of fixed input transducers deployed across a geographic region or (ii) an input transducer in an array of mobile input transducers affixed to aerial drones or ground based vehicles deployed across a geographic region in response to a detected electronic request to create or update the real-time language heat-map data structure in an area of the first geographic location or in response to a detected gap in language detection data in the real-time language heat-map data structure in the area of the geographic region.

18. The method of claim 1, further comprising determining one or more of a gender, emotion, dialect, accent, and prosody associated with the first audio content and electronically storing the determined one or more of the gender, emotion, dialect, accent, and prosody associated with the first audio content in the real-time language heat-map data structure or in another data structure linked to the real-time language heat-map data structure.

19. A computing device for real-time language detection and language heat-map data structure modification, the computing device comprising:
   one or more non-transitory, computer-readable memories;
   one or more transceivers; and
   one or more processors that, in response to executing instructions stored in the one or more non-transitory, computer-readable memories, perform a set of functions comprising:
      receive, from a first electronic audio source, first audio content;
      identify a first geographic location of the first audio content as one of a location of the first electronic audio source and a sound localization process calculated as a function of the location of the first electronic audio source;
      determine that the first audio content includes first speech audio;
      identify, from the first audio content, a first language in which the first speech audio is spoken and creating a first association between the first geographic location and the first language;
      access a real-time language heat-map data structure including at least a second association between the first geographical location and a second language different from the first language;
      modify, based on the first audio content, the real-time language heat-map data structure to include the created first association;
      take a further action as a function of the modified real-time language heat-map data structure comprising at least one of: (i) electronically displaying at least a modified portion of the modified real-time language heat-map data structure at an electronic display coupled to the computing device, (ii) transmitting at least the modified portion of the modified real-time language heat-map data structure to another electronic computing device for further processing, (iii) electronically transmitting a dispatch instruction to a user having a skill or a need in the first language to the first geographic location, and (iv) electronically transmitting a notification to a user having a skill or a need in the first language including identifying the first geographic location and the first language;
      identifying a time and/or date associated with receipt of the first audio content; and
      modifying a historical language heat-map data structure associated with the time and/or date to include the first association, wherein the historical language heat-map data structure includes a plurality of associations across sequential times and/or dates that track a particular language cluster as it moves across a geographic region.

\* \* \* \* \*